United States Patent
Jasinska-Walc et al.

(10) Patent No.: US 12,384,946 B2
(45) Date of Patent: Aug. 12, 2025

(54) HOT MELT ADHESIVE COMPRISING FUNCTIONALIZED POLYOLEFINS

(71) Applicant: SABIC GLOBAL TECHNOLOGIES B.V., Bergen op Zoom (NL)

(72) Inventors: Lidia Jasinska-Walc, Veldhoven (NL); Robbert Duchateau, Roostenlaan (NL); Miloud Bouyahyi, Eindhoven (NL); Nydia Badillo Sampedro, Maastricht (NL); Jakub Kruszynski, Geleen (NL); Jana Hrachová, Sittard (NL); Yingxin Liu, Geleen (NL); Lanti Yang, Noord-Brabant (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 162 days.

(21) Appl. No.: 18/289,963

(22) PCT Filed: May 10, 2022

(86) PCT No.: PCT/EP2022/062533
§ 371 (c)(1),
(2) Date: Nov. 8, 2023

(87) PCT Pub. No.: WO2022/238352
PCT Pub. Date: Nov. 17, 2022

(65) Prior Publication Data
US 2024/0263052 A1     Aug. 8, 2024

(30) Foreign Application Priority Data
May 11, 2021 (EP) .................... 21173300

(51) Int. Cl.
*C09J 123/14* (2006.01)
*C09J 5/06* (2006.01)
*C09J 123/26* (2006.01)

(52) U.S. Cl.
CPC ............. *C09J 123/147* (2013.01); *C09J 5/06* (2013.01); *C09J 123/26* (2013.01); *C09J 2423/10* (2013.01)

(58) Field of Classification Search
CPC ........ C09J 123/147; C09J 123/26; C09J 5/06; C09J 2423/10; C08F 4/65912; C08F 2810/50; C08F 8/14; C08F 210/06
See application file for complete search history.

(56) References Cited

FOREIGN PATENT DOCUMENTS

| EP | 1186619 A2 * | 3/2002 | ............ C08F 210/02 |
|---|---|---|---|
| EP | 2559747 A1 | 2/2013 | |

OTHER PUBLICATIONS

International Search Report for International Application No. PCT/EP2022/062533, International Filing Date May 10, 2022, Date of Mailing Aug. 19, 2022, 3 pages.
Written Opinion for International Application No. PCT/EP2022/062533, International Filing Date May 10, 2022, Date of Mailing Aug. 19, 2022, 5 pages.

* cited by examiner

Primary Examiner — Daniel McNally
(74) Attorney, Agent, or Firm — CANTOR COLBURN LLP

(57) ABSTRACT

Hot melt adhesive including a polar group-containing olefin copolymer has: number average molecular weight ($M_n$) between 10 to 50 kg/mol, crystallinity ($X_c$) content below 30%, enthalpy ($\Delta H$) between 5 to 65 J/g, polydispersity index (PDI) from 2 to 6, melting temperature ($T_m$) between 40 and 120° C., and including at least 80 mol % of a constituent unit of formula (1), optionally a constituent unit of formula (2), and between 0.1 to 1 mol %, of a constituent unit of formula (3):

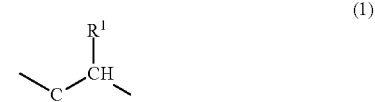

(1)

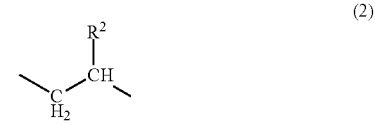

(2)

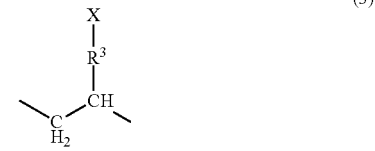

(3)

wherein $R^1$ is H or $CH_3$; $R^2$ is a hydrocarbyl group having 0 to 10 carbon atoms; $R^3$ is a hydrocarbyl group having 2 to 10 carbon atoms, when X is hydroxyl functionality or a hydrocarbyl group having 0 to 10 carbon atoms, when X is polar organic group containing at least one carboxylic acid functionality and 0 to 6 carbon atoms.

6 Claims, No Drawings

HOT MELT ADHESIVE COMPRISING FUNCTIONALIZED POLYOLEFINS

CROSS REFERENCE TO RELATED APPLICATIONS

This application is a National Stage application of PCT/EP2022/062533, filed May 10, 2022, which claims the benefit of European Application No. 21173300.1, filed May 11, 2021, both of which are incorporated by reference in their entirety herein.

TECHNICAL FIELD OF THE INVENTION

The present invention relates to hot melt adhesive comprising functionalized polyolefins.

TECHNOLOGICAL BACKGROUND OF THE INVENTION

Hot Melt Adhesive (HMA) also known as hot glue is a thermoplastic adhesive resin that is solid at ambient temperature and can be molten to apply it on a surface. Most commonly EVA or polyolefin elastomers are applied as HMA. Other examples are thermoplastic polyurethanes (TPU), styrene block copolymers (SBC), polyamides or polyesters.

The HMA can be applied in several forms such as sticks, pellets, beads, granulates, pastilles, chips, slugs, flyers, pillows, blocks, films or spray and in various applications like packaging, hygiene products, furniture, footwear, textile & leather, electronics, book binding and graphics, building & construction, consumer DIY.

HMA provide several advantages over solvent-based adhesives. Volatile organic compounds are reduced or eliminated and drying or curing steps, typically required for 2 component adhesives, is eliminated. Furthermore, HMA typically have high mileage, low odor and are thermally stable. HMA have long shelf life and usually can be disposed of without special precautions. Furthermore, being a thermoplast, a HMA bond can be simply reversed by heating the substrate. The obvious drawback of this reversible bonding is the loss of bond strength at higher temperatures, up to complete melting of the adhesive. Hence, the use of HMA is limited to applications not exposed to elevated temperatures.

Polyolefin-based HMA's show good adhesion to low surface-energy materials such as untreated polyolefins or they can be applied to porous materials such as paper, carton or wood where the adhesion is obtained by physical inclusion of the HMA in the porous material. However, these polyolefin-based HMA's typically show low adhesive strength to polar materials such as metals, glass and polar polymeric materials.

EP1186619, disclose the use of polar functionalized monomer having more than 13 carbons $C_{13}$ in a polyolefin based HMA to improve the adhesion to polar substrates such as polycarbonates and aluminum.

However, HMA containing such functionalized monomer have a limited adhesive strengths.

It is an object of the present invention to provide a hot melt adhesive comprising a polar group-containing olefin copolymer having excellent adhesion properties to metals or polar and nonpolar resins.

There is a need for a new hot melt adhesive having at least one of the following binding properties:
Steel to steel with a Lap Shear Strength above 3 MPa
Aluminum to aluminum with a Lap Shear Strength above 3 MPa
Aluminum to polyolefin with a Lap Shear Strength above 3 MPa
Steel to polyolefin with a Lap Shear Strength above 3 MPa
polyolefin to polyolefin with a Lap Shear Strength above 3 MPa

SUMMARY

This object is achieved by the present invention, an hot melt adhesive comprising a polar group-containing olefin copolymer having:
Number average molecular weight ($M_n$) between 10 to 50 kg/mol, preferably between 20 to 50 kg/mol,
Crystallinity ($X_c$) content below 30%, preferably below 15%, more preferably below 10%,
Enthalpy (ΔH) between 5 to 65 J/g, preferably 5 to 30 J/g,
Polydispersity index (PDI) from 2 to 6, preferably strictly superior to 3 and inferior to 6,
Melting temperature ($T_m$) between 40 and 120° C.,
and comprising at least 80 mol % of a constituent unit represented by the following formula (1), optionally a constituent unit represented by the following formula (2), and between 0.1 to 1 mol %, preferably 0.1 to 0.5 mol %, of a constituent unit represented by the following formula (3):

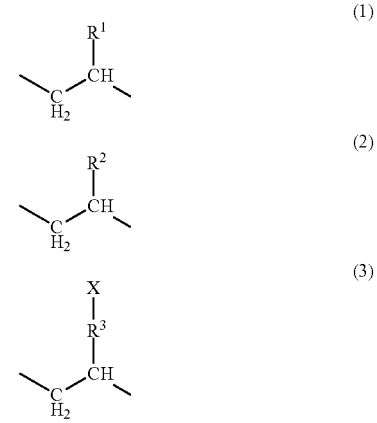

Wherein:
$R^1$ is H or $CH_3$.
$R^2$ is selected from the list comprising: hydrocarbyl group having 0 to 10 carbon atoms, preferentially 2 to 6 and more preferentially 6 when $R^1$=H, and preferably 0, 2 or 4 when $R^1$=$CH_3$.
$R^3$ is either selected from the list comprising:
  hydrocarbyl group having 2 to 10 carbon atoms, preferentially 2 to 8, preferentially 4 to 8, more preferentially 4 or 6, when X is hydroxyl functionality
  hydrocarbyl group having 0 to 10 carbon atoms, preferentially 0 to 6, more preferentially 0 or 4, when X is polar organic group containing at least one carboxylic acid functionality and 0 to 6 carbon atoms.

In some embodiment, the constituent unit represented by the following formula (3) is selected from the group comprising 3-buten-1-ol, 3-buten-2-ol, 5-hexen-1-ol, 5-hexene- 1,2-diol, 7-octen-1-ol, 7-octen-1,2-diol, 5-norbornene-2-methanol, 10-undecen-1-ol, preferably 5-hexen-1-ol.

In some embodiment, the constituent unit represented by the following formula (3) is selected from the group comprising acrylic acid, 3-butenoic acid, 4-pentenoic acid, 5-hexenoic acid, 10-undecenoic acid, 5-norbornene-2-carboxylic acid or 5-norbornene-2-acetic acid, preferably acrylic acid, 3-butenoic acid, 4-pentenoic acid or 5-norbornene-2-carboxylic acid.

In some embodiment, the constituent unit represented by the following formula (3) comprise a hydroxyl group which has been esterified by a polyprotic acid, preferentially, preferably a diprotic or triprotic acid, preferentially citric acid, citric acid anhydride, isocitric acid, tartaric acid, succinic acid, succinic acid anhydride, fumaric acid, malic acid, maleic acid anhydride, itaconoic acid, itaconoic acid anhydride, oxalic acid, trimesic acid, 1,2,4-benzenetricarboxylix-1,2-anhydride, propan-1,2-3-tricarboxylic acid, PBTC acid-2-phosphonobutane-1,2,4-tricarboxylic acid, preferably citric acid, to obtain the following constituent unit according to the formula (4).

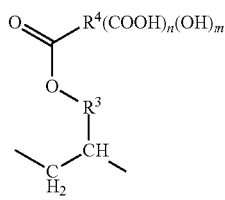

(4)

Wherein:
R³ is selected from the list comprising: hydrocarbyl group having 2 to 10, preferably 4 to 10 carbon atoms, more preferentially 4 to 8, even more preferentially 4 or 6,
R⁴ is selected from the list comprising: hydrocarbyl group having 2 to 10 carbon atoms,
n is 1 to 3 and m 0 to 2.

In some embodiment, the esterification has been performed in solution.

In some embodiment, wherein the esterification has been performed during reactive extrusion process.

In some embodiment, the polymerization has been performed using a solution process.

In some embodiment, a purification step consisting of removing traces of the protective agents, which remain in the resin after polymerization, has been performed.

In some embodiment, the hot melt adhesive according to the invention is having at least one preferably two, more preferably three, more preferably four, more preferably all of the following binding properties:
Steel to steel with a Lap Shear Strength above 3 MPa,
Aluminum to aluminum with a Lap Shear Strength above 3 MPa,
Steel to polyolefin with a Lap Shear Strength above 3 MPa,
Aluminum to polyolefin with a Lap Shear Strength above 3 MPa,
Polyolefin to polyolefin with a Lap Shear Strength above 3 MPa.

Another aspect of the invention is the use of hot melt adhesive according to the invention, in order to glue together metals, glass, polar polymers or metals to glass, metal to polar glass to polar polymers, metals to polyolefins, glass to polyolefins or polar polymers to polyolefins.

DETAILED DESCRIPTION

The present invention preferably relates to a polyolefin-based hot melt adhesive resin comprising hydroxyl functionalities or a polar organic group containing at least one carboxylic acid functionality.

According to the invention, the polyolefin-based hot melt adhesive resin is a copolymer of at least one first olefin monomer and a hydroxyl or a polar organic group containing at least one carboxylic acid functionalized $C_2$ to $C_{12}$, preferably $C_4$ to $C_{12}$, more preferably $C_4$ to $C_{10}$ olefin monomer.

In some embodiment, the first olefin monomer is ethylene or propylene, preferably propylene.

In some embodiment, the hot melt adhesive resin according to the invention is a polyolefin-based copolymer, preferably a terpolymer resulting from the polymerization of a first olefin monomer, with optionally a second olefin monomer selected from the list comprising ethylene or $C_3$ to $C_{12}$ olefin monomer and a third—functionalized—olefin monomer, which is selected from the list comprising a hydroxyl or a polar organic group containing at least one carboxylic acid functionalized $C_2$ to $C_{12}$, preferably $C_4$ to $C_{12}$ olefin monomer.

In some embodiment, when the first olefin monomer is ethylene, preferably the second olefin monomer is 1-butene, 1-hexene or 1-octene.

In some embodiment, when the first olefin monomer is propylene, preferably the second olefin monomer is ethylene, 1-butene, 1-hexene or 1-octene.

In some embodiment, the third monomer is a hydroxyl functionalized olefin monomer, preferably 3-buten-1-ol, 3-buten-2-ol, 5-hexen-1-ol, 5-hexene-1,2-diol, 7-octen-1-ol, 7-octen-1,2-diol, 5-norbornene-2-methanol, 10-undecen-1-ol, preferably 5-hexen-1-ol.

In some embodiment, the third monomer is a polar organic group containing at least one carboxylic acid functionalized olefin monomer, preferably acrylic acid, 3-butenoic acid, 4-pentenoic acid, 5-hexenoic acid, 10-undecenoic acid, 5-norbornene-2-carboxylic acid or 5-norbornene-2-acetic acid, more preferably acrylic acid, 3-butenoic acid, 4-pentenoic acid or 5-norbornene-2-carboxylic acid.

In some embodiment, the hot melt adhesive resin is made in a solution process using a protected hydroxyl-functionalized $C_4$ to $C_{12}$, preferably C to $C_{12}$, preferably C to Cao, preferably $C_6$ to C olefin monomer. Generally, the protection group is silyl halides, trialkyl aluminum complexes, dialkyl aluminum alkoxide complexes, dialkyl magnesium complexes, dialkyl zinc complexes or trialkyl boron complexes.

Although this is not essential, a purification step consisting in removing the traces of the protective agents which remain the resin, is preferred.

By doing so, the best adhesion strengths are obtained. Inventors believe that by flushing the protection species from the resin, it allows to have more hydroxyl functionalities available to enhance the binding property of the resin to polar materials.

In some embodiment, in order to enhance the quantity of functional groups and therefore the binding property of the resin, an esterification of the hydroxyl-functionalized olefin terpolymer can be performed.

Such esterification can be obtain for example by using an polyprotic acid or the corresponding acid anhydride, preferably a diprotic or triprotic acid for example citric acid, citric acid anhydride, isocitric acid, tartaric acid, succinic acid, succinic acid anhydride, fumaric acid, malic acid, maleic acid anhydride, itaconoic acid, itaconoic acid anhydride, oxalic acid, trimesic acid, 1,2,4-benzenetricarboxylix-1,2-anhydride, propan-1,2-3-tricarboxylic acid, PBTC acid-2-phosphonobutane-1,2,4-tricarboxylic acid, preferably citric acid.

This esterification by a polyprotic acid or acid anhydride can be performed in solution process or during the extrusion process.

The esterification by a polyprotic acid or acid anhydride provides the resin with more polar groups and therefore to be able to bind with better performance different materials such as metals, glass, wood or polar polymer materials such as for example polycarbonates, PET, nylons, EVA, EVOH, ABS, PMMA, PVC, PVA.

In another embodiment, the hot melt adhesive can undergo a purification step and an esterification step.

The tunable functionality of these functionalized olefin terpolymer HMA's makes them very suitable for gluing the same or different polar substrates such as metals, glass, wood and polar polymers.

The general apolar nature of the functionalized olefin terpolymer HMA's furthermore provides excellent adhesion to low surface energy substrates such as polyolefins (i.e. HDPE, LDPE, LLDPE, PP), making these HMA's very suitable for gluing polyolefins to polyolefins, or for gluing polyolefins to polar substrates such as metals, glass, wood and polar polymers.

Examples

The following examples are not limiting examples and have been realized with the following monomers: ethylene ($C_2$), propylene ($C_3$), 1-hexene (C), 1-octene (C) and 5-hexen-1-ol ($C_6OH$). However, other monomer could be use in order to achieve the present invention.

Synthesis of Functionalized Hot Melt Adhesive According to the Invention
Synthesis of poly($C_3$-co-$C_6$-co-C$_5$OH).

The polymerization experiment was carried out using a stainless steel BÜCHI reactor (2 L) filled with pentamethylheptane (PMH) solvent (1 L) using a stirring speed of 600 rpm. Catalyst and comonomer solutions were prepared in a glove box under an inert dry nitrogen atmosphere.

The reactor was first heated to 40° C. followed by the addition of TiBA (1.0 M solution in toluene, 2 mL), 1-hexene (neat 10 mL), and triethylaluminum (TEA)-pacified 5-hexen-1-ol (1.0 M solution in toluene, TEA:5-hexen-1-ol (mol ratio)=1, 10 mL). The reactor was charged at 40° C. with gaseous propylene (100 g) and the reactor was heated up to the desired polymerization temperature of 130° C. resulting in a partial propylene pressure of about 15 bar. Once the set temperature was reached, the polymerization reaction was initiated by the injection of the pre-activated catalyst precursor bis((2-oxoyl-3-(dibenzo-1H-pyrrole-1-yl)-5-(methyl)phenyl)-2-phenoxy)-2,4-pentanediylhafnium (IV) dimethyl [CAS 958665-18-4]; other name hafnium [[2',2'''-[(1,3-dimethyl-1,3-propanediyl)bis(oxy-κO)]bis[3-(9H-carbazol-9-yl)-5-methyl[1,1'-biphenyl]-2-olato-κO]] (2-)]dimethyl] (Hf-04, 2 μmol) in MAO (30 wt % solution in toluene, 11.2 mmol). The reaction was stopped by pouring the polymer solution into a container flask containing demineralized water/iPrOH (50 wt %, 1 L) and Irganox 1010 (1.0 M, 2 mmol). The resulting suspension was filtered and dried at 80° C. in a vacuum oven, prior the addition of Irganox 1010 as an antioxidant. The poly(propylene-co-1-hexene-co-5-hexen-1-ol) (25.6 g) was obtained as a white powder.

Synthesis of Comparative Example
Poly(C3-Co-C6)

The polymerization experiment was carried out using a stainless steel BÜCHI reactor (2 L) filled with pentamethylheptane (PMH) solvent (1 L) using a stirring speed of 600 rpm. Catalyst and comonomer solutions were prepared in a glove box under an inert dry nitrogen atmosphere.

The reactor was first heated to 40° C. followed by the addition of TiBA (1.0 M solution in toluene, 2 mL) and 1-hexene (neat 30 mL). The reactor was charged at 40° C. with gaseous propylene (100 g) and the reactor was heated up to the desired polymerization temperature of 130° C. resulting in a partial propylene pressure of about 15 bar. Once the set temperature was reached, the polymerization reaction was initiated by the injection of the pre-activated catalyst precursor bis((2-oxoyl-3-(dibenzo-1H-pyrrole-1-yl)-5-(methyl)phenyl)-2-phenoxy)-2,4-pentanediylhafnium (IV) dimethyl [CAS 958665-18-4]; other name hafnium [[2',2'''-[(1,3-dimethyl-1,3-propanediyl)bis(oxy-κO)]bis[3-(9H-carbazol-9-yl)-5-methyl[1,1'-biphenyl]-2-olato-κO]] (2-)]dimethyl] (Hf-04, 1.5 μmol) in MAO (30 wt % solution in toluene, 11.2 mmol). The reaction was stopped by pouring the polymer solution into a container flask containing demineralized water/iPrOH (50 wt %, 1 L) and Irganox 1010 (1.0 M, 2 mmol). The resulting suspension was filtered and dried at 80 (C in a vacuum oven, prior the addition of Irganox 1010 as an antioxidant. The poly(propylene-co-hexene) (29.5 g) was obtained as a white powder.

TABLE 1

Characteristics of copolymer and terpolymers with different composition produced according to the abovementioned protocols.

| EX | Composition | $C_3:C_{2-6-8}:C_6OH$* | Xc [%] | OH group mol % | $M_n$ [kg/mol] | PDI ($M_w/M_n$) | $T_m$ [° C.] | ΔH [J/g] |
|---|---|---|---|---|---|---|---|---|
| EX1 | poly($C_3$-co-$C_6$-co-$C_6OH$) | 89.6:9.9:0.5 | 2.6 | 0.5 | 46.9 | 5.2 | 68.3 | 5.0 |
| EX2 | poly(C3-co-C6-co-C6OH) | 90.3:9.2:0.5 | 5.9 | 0.5 | 32.8 | 3.1 | 73.7 | 12.3 |
| EX3 | poly($C_3$-co-$C_6$-co-$C_6OH$) | 91.6:8.1:0.3 | 10.3 | 0.3 | 22.8 | 3.2 | 84.6 | 21.3 |
| EX4 | poly($C_3$-co-$C_6$-co-$C_6OH$) | 90.6:9.1:0.3 | 10.4 | 0.3 | 24.9 | 3.3 | 76.9 | 21.5 |
| EX5 | poly($C_3$-co-$C_6$-co-$C_6OH$) | 90.5:9.2:0.3 | 10.4 | 0.3 | 24.9 | 3.3 | 76.9 | 21.5 |
| EX6 | poly($C_3$-co-$C_8$-co-$C_6OH$) | 96.3:3.4:0.3 | 23.5 | 0.3 | 31.4 | 3.3 | 121.1 | 55.3 |
| EX7 | poly($C_3$-co-$C_8$-co-$C_6OH$) | 94.4:5.3:0.3 | 18.2 | 0.3 | 29.5 | 3.6 | 106.5 | 47.9 |
| EX8 | poly($C_3$-co-$C_8$-co-$C_6OH$) | 91.9:7.8:0.3 | 10.5 | 0.3 | 36.0 | 4.5 | 86.9 | 27.3 |
| EX9 | poly($C_3$-co-$C_6$-co-$C_6OH$) | 94.7:5.0:0.3 | 22.7 | 0.3 | 21.1 | 3.6 | 108.8 | 47.1 |

TABLE 1-continued

Characteristics of copolymer and terpolymers with different composition produced according to the abovementioned protocols.

| EX | Composition | $C_3:C_{2-6-8}:C_6OH$* | Xc [%] | OH group mol % | $M_n$ [kg/mol] | PDI $(M_w/M_n)$ | $T_m$ [° C.] | $\Delta H$ [J/g] |
|---|---|---|---|---|---|---|---|---|
| EX10 | poly($C_3$-co-$C_6$-co-$C_6OH$) | 95.5:4.2:0.3 | 21.8 | 0.3 | 38.0 | 3.3 | 114.6 | 45.1 |
| EX11 | poly(C3-co-C6-co-C6OH) | 95.0:4.9:0.1 | 29.6 | 0.1 | 28.8 | 4.4 | 112.1 | 61.7 |
| EX12 | Poly($C_3$-co-$C_6$-co-$C_6OH$) | 90.7:9.0:0.3 | 3.4 | 0.3 | 41.3 | 3.4 | 77.8 | 7.1 |
| EX13 | poly($C_3$-co-$C_6OH$) | 97.4:0:2.6 | 10.2 | 2.62 | 21.7 | 2.3 | 117.5 | 21.1 |
| EX14 | poly($C_3$-co-$C_2$-co-$C_6OH$) | 87.1:12.6:0.3 | 0.8 | 0.3 | 78.3 | 3.2 | 50.1 | 1.7 |
| EX15 | poly($C_3$-co-$C_2$-co-$C_6OH$) | 86.6:12.6:0.8 | 0.4 | 0.8 | 23.7 | 3.5 | 43.2 | 0.8 |

*mol % with a standard deviation = 0.1 mol %

TABLE 2

Characteristics of the comparative poly($C_3$-co-$C_6$) copolymer produced according to the abovementioned protocols.

| EX | Composition | $C_3:C_6$ | Crystallinity level [%] | $M_n$ [kg/mol] | PDI | $T_m$ [° C.] | $\Delta H$ [J/g] |
|---|---|---|---|---|---|---|---|
| CEX1 | poly($C_3$-co-$C_6$) | 91.6:8.4 | 12.3 | 25.7 | 3.1 | 85.9 | 25.5 |

Purification Protocol

The copolymer obtain from the solution process may be purify in order to remove trace of protective species. To do so the copolymer (10 g) was dispersed in mixture of dry toluene (400 ml) and concentrated (37%) HCl (10 ml, 0.13 mol, 4.74 g) and heated under reflux until the terpolymer dissolved. Once the polymer was properly dissolved, methanol (250 ml) was added to the hot mixture and the mixture was heated under stirring at 90-100° C. for 1 additional hour. Then the polymer was precipitated in cold methanol, filtered and washed 2× with methanol.

Esterification Protocol

An esterification of the hydroxyl function has been done for the examples 3, 4 and 12 of Table 1 following the protocol.

Ti(OiPr)$_4$ (1.5 mol excess to OH groups of hydroxyl-functionalized terpolymer $C_3$-co-$C_6$-co-CsOH diluted in 3 mL of toluene) was added to a dry solution of poly($C_3$-co-$C_6$-co-CsOH) (10 g) at 100° C. After refluxing for one hour, a solution of citric acid (10/1 mol ratio citric acid/OH of poly($C_3$-co-$C_6$-co-CsOH)) in 3 mL of tetrahydrofuran was added. After refluxing for 3 hours the polymer was precipitated in cold ethanol. The precipitate was mixed with ethanol and filtrated to remove unreacted citric acid. The remaining white solid was dried in a vacuum oven (60° C.).

This esterification was performed after the polymerization of the terpolymer and can be perform in solution process (Ex16, 17 and 18) or under reactive extrusion process (EX19, 20 and 21).

TABLE 3

Results of esterification using citric acid.

| EX | Composition | Crystallinity [%] | $M_n$ [kg/mol] | PDI | $T_m$ [° C.] | $\Delta H$ [J/g] |
|---|---|---|---|---|---|---|
| EX16 | poly($C_3$-co-$C_6$-co-$C_6OOX$) | 13.7 | 32.9 | 2.1 | 86.8 | 28.5 |
| EX17 | poly($C_3$-co-$C_6$-co-$C_6OOX$) | 12.4 | 22.1 | 3.7 | 79.2 | 25.7 |
| EX18 | poly($C_3$-co-$C_6$-co-$C_6OOX$) | 11.3 | 35.7 | 3.5 | 78.8 | 23.4 |
| EX19 | poly($C_3$-co-$C_6$-co-$C_6OOX$) | 4.6 | 25.7 | 4.0 | 83.1 | 9.6 |
|  |  |  |  |  | 160.5 | 18.6 |
| EX20 | poly($C_3$-co-$C_6$-co-$C_6OOX$) | 8.1 | 24.8 | 5.7 | 78.3 | 12.3 |
|  |  |  |  |  | 160.9 | 16.3 |
| EX21 | poly($C_3$-co-$C_6$-co-$C_6OOX$) | 13.3 | 26.8 | 4.3 | 75.8 | 8.8 |
|  |  |  |  |  | 161.0 | 18.7 |

Measurements

Size Exclusion Chromatography (SEC).

SEC measurements were performed according to ISO 16014-4 and ASTM D6474 methods at 150° C. on a Polymer Char GPC-IR® built around an Agilent GC oven model 7890, equipped with an autosampler and the Integrated Detector IR4. 1,2-Dichlorobenzene (o-DCB) was used as an eluent at a flow rate of 1 mL/min. The data were processed using Calculations Software GPC One®. The molecular weights ($M_n$) (Mw) and PDI were calculated with respect to polyethylene or polystyrene standards.

Liquid-State $^1H$ NMR.

$^1H$ NMR and 13C NMR spectra were recorded at room temperature or at 80° C. using a Varian Mercury Vx spectrometer operating at Larmor frequencies of 400 MHz and 100.62 MHz for $^1H$ and $^{13}C$, respectively. For $^1H$ NMR experiments, the spectral width was 6402.0 Hz, acquisition time 1.998 s and the number of recorded scans equal to 64. $^{13}C$ NMR spectra were recorded with a spectral width of 24154.6 Hz, an acquisition time of 1.3 s, and 256 scans.

Differential Scanning Calorimetry (DSC).

Melting ($T_m$) temperatures as well as enthalpies of the melting point ($\Delta H$ [J/g]) of the transitions were measured according to the ISO 11357-1:2016 using a Differential Scanning Calorimeter Q100 from TA Instruments. The measurements were carried out at a heating and cooling rate of 10° C./min from −50° C. to 240° C. The transitions were deducted from the second heating and cooling curves.

The DSC has been used for the determination of the Crystallinity ($X_c$) content by comparing the enthalpies of melting transition of the sample with melting transition of the 100% crystalline polypropylene.

Compression-Molding Experiments.

The film samples, used for the lap shear test, were prepared via compression-molding using PP ISO settings on LabEcon 600 high-temperature press (Fontijne Presses, the Netherlands). Namely, the films (25 mm×12.5 mm×0.5 mm) of functionalized polyolefins were loaded between the substrates: PP-PP, Steel-Steel, Aluminum-Aluminum or their combination with overlap surface 12.5 mm. Then, the compression-molding cycle was applied: heating to 130° C., stabilizing for 3 min with no force applied, 5 min with 100 kN (0.63 MPa) normal force and cooling down to 40° C. with 10° C./min and 100 kN (0.63 MPa) normal force.

Lap Shear Strength.

The measurements were performed according to the ASTM D1002-10(2019) with a Zwick type Z020 tensile tester equipped with a 10 kN load cell. Before measurements, samples were conditioned for 7 days at room temperature. The tests were performed on specimens (10 cm×2.5 cm) with surface overlapping 12.5 mm. A grip-to-grip separation of 140 mm was used. The samples were pre-stressed to 3 N, then loaded with a constant cross-head speed 100 mm/min. To calculate the lap shear strength the reported force value divided by the bonding surface (25 mm×12.5 mm) of the specimens. The reported values are an average of at least 5 measurements of each composition.

Results

TABLE 4

Lap shear test results.

| EX | Lap Shear Strength [MPa] | | | | |
|---|---|---|---|---|---|
| | ALUMI-NUM/PP | STEEL/PP | ALUMI-NUM/ALUMI-NUM | STEEL/STEEL | PP/PP |
| EX1 | 4.14 +/− 0.73 | 4.35 +/− 0.46 | 3.82 +/− 0.15 | 4.66 +/− 0.87 | 4.48 +/− 0.42 |
| EX2 | 4.42 +/− 0.81 | 5.31 +/− 0.99 | 3.47 +/− 1.05 | 7.57 +/− 0.53 | 5.16 +/− 0.58 |
| EX3 | 0.98 +/− 0.18 | 5.08 +/− 1.05 | 3.36 +/− 0.30 | 3.98 +/− 0.88 | 5.17 +/− 0.57 |
| EX4 | 3.43 +/− 0.42 | 3.90 +/− 0.32 | 2.07 +/− 0.49 | 5.47 +/− 0.55 | 5.77 +/− 0.25 |
| EX5 | 3.43 +/− 0.42 | 3.90 +/− 0.32 | 2.07 +/− 0.49 | 5.47 +/− 0.55 | 5.77 +/− 0.25 |
| EX6 | 0 | 0 | 8.14 +/− 0.58 | 16.78 +/− 0.72 | 0 |
| EX7 | 1.08 +/− 0.39 | 1.79 +/− 0.66 | 6.45 +/− 0.58 | 9.05 +/− 0.62 | 5.16 +/− 0.46 |
| EX8 | 0.86 +/− 0.48 | 0.34 +/− 0.13 | 4.04 +/− 0.45 | 10.04 +/− 2.49 | 5.02 +/− 0.22 |
| EX9 | 2.24 +/− 0.27 | 2.47 +/− 1.01 | 5.24 +/− 0.67 | 7.29 +/− 1.29 | 5.96 +/− 0.54 |
| EX10 | 0.20 +/− 0.06 | 0 | 0.50 +/− 0.32 | 0.85 +/− 0.59 | 4.43 +/− 0.37 |
| EX11 | 0.19 +/− 0.12 | 0.57 +/− 0.59 | 0.81 +/− 0.17 | 2.48 +/− 0.78 | 5.93 +/− 0.49 |
| EX12 | 1.15 +/− 0.54 | 1.73 +/− 0.29 | 1.69 +/− 0.28 | 1.20 +/− 0.12 | 4.76 +/− 0.32 |
| EX13 | 0 | 0 | 2.34 +/− 0.78 | 1.91 +/− 0.39 | 0 |
| EX14 | 1.04 +/− 0.25 | 0.93 +/− 0.09 | 0.60 +/− 0.06 | 0.51 +/− 0.07 | 1.28 +/− 0.20 |
| EX15 | 1.64 +/− 0.30 | 1.10 +/− 0.24 | 1.26 +/− 0.69 | 0.98 +/− 0.32 | 2.05 +/− 0.47 |

Comparative Example

| EX | Lap Shear Strength [MPa] | | | | |
|---|---|---|---|---|---|
| | ALUMI-NUM/PP | STEEL/PP | ALUMI-NUM/ALUMI-NUM | STEEL/STEEL | PP/PP |
| CEX1 | 0.43 +/− 0.19 | 0.52 +/− 0.30 | 0.84 +/− 0.29 | 2.73 +/− 0.53 | 5.15 +/− 0.30 |

Esterification Results

| EX | Lap Shear Strength [MPa] | | | | |
|---|---|---|---|---|---|
| | ALUMI-NUM/PP | STEEL/PP | ALUMI-NUM/ALUMI-NUM | STEEL/STEEL | PP/PP |
| EX16 | 5.41 +/− 0.53 | 3.34 +/− 1.38 | 5.63 +/− 0.83 | 8.23 +/− 0.57 | 6.45 +/− 0.12 |
| EX17 | 3.69 +/− 0.39 | 3.01 +/− 0.29 | 5.60 +/− 0.21 | 4.10 +/− 0.80 | 6.21 +/− 0.22 |
| EX18 | 3.29 +/− 0.50 | 3.94 +/− 0.31 | 4.90 +/− 0.62 | 3.93 +/− 0.34 | 5.05 +/− 0.36 |
| EX19 | 3.78 +/− 0.26 | 2.67 +/− 0.19 | 5.35 +/− 0.78 | 8.18 +/− 2.61 | 3.03 +/− 0.88 |
| EX20 | 4.12 +/− 0.23 | 4.83 +/− 0.36 | 2.11 +/− 0.48 | 5.81 +/− 0.62 | 5.51 +/− 0.48 |
| EX21 | 2.48 +/− 0.83 | 3.52 +/− 0.69 | 5.15 +/− 1.05 | 7.60 +/− 1.25 | 4.01 +/− 0.24 |

From the above result, Invertor have been surprised to find that the composition according to the invention allows to have lower and tunable crystallinity and higher and tunable tackiness, as well that lower brittleness and lower $T_m$ that the ones described in the prior art.

In addition, such features render usable the HMA according to the invention for new applications, in particular to glue material having a low melting point such thermoplastic.

The invention claimed is:

1. A hot melt adhesive comprising a polar group-containing olefin copolymer having:
    a number average molecular weight ($M_n$) between 10 to 50 kg/mol, measured according to the ISO 16014-4 and ASTM D6474 methods at 150° C. on a Polymer Char GPC-IR built around an Agilent GC oven model 7890,
    a crystallinity ($X_c$) content below 30%, measured according to ISO 11357-1:2016 using a Differential Scanning Calorimeter Q100 from TA Instruments, an enthalpy (ΔH) between 5 to 65 J/g, measured according to ISO 11357-1:2016 using a Differential Scanning Calorimeter Q100 from TA Instruments, a polydispersity index (PDI) from 2 to 6, measured according to the method ISO 16014-4 and ASTM D6474 methods at 150° C. on a Polymer Char GPC-IR® built around an Agilent GC oven model 7890, a melting temperature ($T_m$) between 40 and 120° C., measured according to ISO 11357-1:2016 using a Differential Scanning Calorimeter Q100 from TA Instruments and comprising at least 80 mol % of a constituent unit represented by the following formula (1), optionally a constituent unit represented by the following formula (2), and between 0.1 to 1 mol %, of a constituent unit represented by the following formula (3):

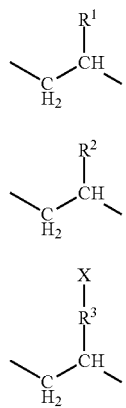

wherein:
$R^1$ is H or $CH_3$,
$R^2$ is a hydrocarbyl group having 0 to 10 carbon atoms,
$R^3$ is either
  (1) a hydrocarbyl group having 2 to 10 carbon atoms, when X is a hydroxyl functionality, or
  (2) a hydrocarbyl group having 0 to 10 carbon atoms, when X is a polar organic group containing at least one carboxylic acid functionality and 0 to 6 carbon atoms.

2. The hot melt adhesive according to claim 1, wherein the constituent unit represented by formula (3) is selected from the group consisting of 3-buten-1-ol, 3-buten-2-ol, 5-hexen-1-ol, 5-hexene-1,2-diol, 7-octen-1-ol, 7-octen-1,2-diol, 5-norbornene-2-methanol, and 10-undecen-1-ol.

3. The hot melt adhesive according to claim 1, wherein the constituent unit represented by formula (3) is selected from the group consisting of acrylic acid, 3-butenoic acid, 4-pentenoic acid, 5-hexenoic acid, 10-undecenoic acid, 5-norbornene-2-carboxylic acid or 5-norbornene-2-acetic acid, preferably acrylic acid, 3-butenoic acid, 4-pentenoic acid, and 5-norbornene-2-carboxylic acid.

4. The hot melt adhesive according to claim 1, wherein the constituent unit represented by formula (3) comprise a hydroxyl group which has been esterified by a polyprotic acid, to obtain the following constituent unit according to the formula (4),

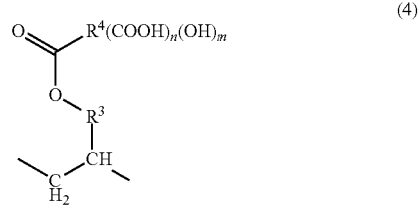

wherein:
$R^3$ is a hydrocarbyl group having 2 to 10, carbon atoms,
$R^4$ is a hydrocarbyl group having 2 to 10 carbon atoms,
n is 1 to 3 and m 0 to 2.

5. The hot melt adhesive according to claim 1, having at least one of the following binding properties measured according to the ASTM D1002-10(2019) with a Zwick type Z020 tensile tester equipped with a 10 kN load cell:

Steel to steel with a Lap Shear Strength above 3 MPa,
Aluminum to aluminum with a Lap Shear Strength above 3 MPa,
Steel to polyolefin with a Lap Shear Strength above 3 MPa,
Aluminum to polyolefin with a Lap Shear Strength above 3 MPa, or
Polyolefin to polyolefin with a Lap Shear Strength above 3 MPa.

6. A method comprising applying the hot melt adhesive according to claim 1 to glue together metals, glass, polar polymers or metals to glass, metal to polar glass to polar polymers, metals to polyolefins, glass to polyolefins or polar polymers to polyolefins.

* * * * *